US009839087B2

(12) United States Patent
Whitfield

(10) Patent No.: US 9,839,087 B2
(45) Date of Patent: Dec. 5, 2017

(54) LIGHTING SYSTEM

(75) Inventor: David Whitfield, Artarmon NSW (AU)

(73) Assignee: Enlighten Australia PTY LTD (AU)

( * ) Notice: Subject to any disclaimer, the term of this patent is extended or adjusted under 35 U.S.C. 154(b) by 939 days.

(21) Appl. No.: 13/980,214

(22) PCT Filed: Jan. 18, 2012

(86) PCT No.: PCT/AU2012/000035
§ 371 (c)(1),
(2), (4) Date: Feb. 5, 2014

(87) PCT Pub. No.: WO2012/097407
PCT Pub. Date: Jul. 26, 2012

(65) Prior Publication Data
US 2014/0139019 A1    May 22, 2014

(30) Foreign Application Priority Data
Jan. 18, 2011    (AU) ............................... 2011100078

(51) Int. Cl.
*H05B 33/08*    (2006.01)
*F21S 9/00*    (2006.01)
(Continued)

(52) U.S. Cl.
CPC ............ *H05B 33/0854* (2013.01); *F21S 9/00* (2013.01); *F21S 10/00* (2013.01); *F21V 23/0442* (2013.01);
(Continued)

(58) Field of Classification Search
CPC ......... F21S 10/00; F21S 9/00; F21V 23/0442; H02J 9/00; H05B 33/0842;
(Continued)

(56) References Cited

U.S. PATENT DOCUMENTS 5,646,486 A * 7/1997 Edwards ............... H02J 7/0075
307/66
2002/0159270 A1* 10/2002 Lynam ................... B60K 35/00
362/492
(Continued)

OTHER PUBLICATIONS

Australian Patent Office, International Search Report for International Application No. PCT/AU2012/000035, dated Nov. 14, 2012.

*Primary Examiner* — Rexford Barnie
*Assistant Examiner* — Elim Ortiz
(74) *Attorney, Agent, or Firm* — Design IP

(57) ABSTRACT

A lighting system (1) has a first lighting circuit (2) configured to provide a first predetermined level of lighting intensity. The first lighting circuit (2) is configured to receive power from a mains electricity supply (3) or from a battery source (4) if the mains supply is unavailable. The first lighting circuit (2) is connected to at least one first Light source (5) and configured, when actuated, to provide lighting at the first predetermined level of lighting intensity. At this time, the first light source is in either an on or off state or a level of light required to raise ambient light level above a predetermined level. The system (1) further has a second lighting circuit (13) configured to provide lighting at least a second predetermined level of lighting intensity. The second lighting circuit (13) is configured to receive power from the mains electricity supply (3) and is connected to at least one second light source (14). The second lighting circuit (13) has at least one sensor (18) with an input such that actuation thereof causes the second light source (14) to provide the second predetermined level of lighting intensity for a predetermined period of time, in response to ambient illumination meeting or exceeding a predetermined intensity, when said sensor has no input or has had no input for a predetermined period of time, or until re-set. In the system (1), the second predetermined level of lighting intensity is greater than said first predetermined level of lighting.

15 Claims, 4 Drawing Sheets

(51) Int. Cl.
  *F21S 10/00* (2006.01)
  *F21V 23/04* (2006.01)
  *H02J 9/00* (2006.01)
  *F21W 131/10* (2006.01)
  *F21W 131/40* (2006.01)
  *F21Y 115/10* (2016.01)

(52) U.S. Cl.
  CPC ............ *H02J 9/00* (2013.01); *H05B 33/0842* (2013.01); *F21W 2131/10* (2013.01); *F21W 2131/40* (2013.01); *F21Y 2115/10* (2016.08); *Y10T 307/344* (2015.04)

(58) Field of Classification Search
  CPC ........... H05B 33/0854; F21W 2131/10; F21W 2131/40; F21Y 2101/00; Y10T 307/344
  See application file for complete search history.

(56) References Cited

U.S. PATENT DOCUMENTS

| | | |
|---|---|---|
| 2004/0047153 A1 | 3/2004 | Lee |
| 2006/0238136 A1 | 10/2006 | Johnson, III |
| 2009/0251058 A1 | 10/2009 | Chen |
| 2010/0102230 A1 | 4/2010 | Chang et al. |
| 2010/0271802 A1* | 10/2010 | Recker ............... H05B 33/0803 362/20 |

* cited by examiner

LIGHTING SYSTEM

FIELD OF THE INVENTION

The present invention relates to lighting and, in particular, to a lighting system.

The invention has been developed primarily for use in fire escapes, car parks and tunnels and will be described hereinafter with reference to these applications. However, it will be appreciated that the invention is not limited to these particular fields of use.

BACKGROUND OF THE INVENTION

The use of sensor actuated security lighting is well known. These lighting systems are typically disposed around an entrance or front door area of a building or property. A microwave or infrared sensor is connected to one or more lights so that once a sensor is triggered by movement or the presence of body heat, the light is actuated. Usually, the light(s) remain on for some predetermined period of time.

These lighting systems not only provide some level of security, they are also useful for automatically actuating the lights in a dark environment when a person may not be able to see clearly or have access to necessary switches to actuate the lights. It is for this reason sensor lights are often found around entry ways. Of course, such sensor lights also serve the purpose of providing the illusion a building or property may be occupied when it is not.

Other known lighting systems include photovoltaic switching systems which sense the ambient light levels and if these levels fall below a predetermined threshold value, lighting is automatically switched on. Systems using photovoltaic switches are often used together with security lighting but are perhaps most well known in flashing orange roadside lamps. In these systems, once the level of ambient light reduces below a predetermined level, the light comes on until the ambient light increases back to that predetermined level in which case the lighting switches off.

Whilst the ability for lights to be able to be turned off and on in response to motion or ambient light conditions is desirable in many circumstances, there are many applications in which whilst useful, such is not ideal. For example, under Australian Building Standards, fire escapes must have a minimum level of emergency lighting intensity at all times. This level of lighting is dimmer than general security lighting as the fire escape stairs need only be lit brightly enough to provide adequate vision to allow emergency egress. Fire escapes are often also used as a means of moving between floors of a building and for this, the Australian Building Standards require a higher level of lighting than emergency lighting.

As such, standard lighting is provided that is maintained continuously. Many fire escapes are known to have at least some natural light ingress, however, this rarely provides sufficient light intensity for the entire fire escape and continuous lighting provides that minimum intensity for the darkest points. This usually requires constantly lighting an entire fire escape.

In the case of car parks, for example, a minimum level of security lighting is required. Often, natural lighting can be insufficient in some locations to provide the minimum level. To err on the side of caution, however, security lighting providing a minimum level of light over an entire car park is installed. This level of light need not be sufficient to read a book or the like but to simply allow people to discern figures and movement.

In the case of vehicle and train tunnels, when travelling from bright daylight external to the tunnel into it makes a significant change in contrast occur. The tunnels have a minimum level of light intensity for security purposes but this is not always useful in the case of tunnels, especially those which intermittently break daylight.

The motion sensing of people or other events is not always desirable such as in fire escapes where a minimum level of lighting is required to allow a sufficient level of visibility to any potential users.

Genesis of the Invention

The genesis of the invention is a desire to provide a lighting system appropriate for use in car parks, tunnels, fire escapes or the like, or to provide a useful alternative.

SUMMARY OF THE INVENTION

According to an aspect of their invention there is provided a lighting system comprising:
  a first lighting circuit configured to provide a first predetermined level of lighting intensity, said first lighting circuit configured to receive power from a mains electricity supply or from a battery source if said mains supply is unavailable, said first lighting circuit connected to at least one first light source and configured, when actuated, to provide lighting at said first predetermined level of lighting intensity wherein said first light source is in either an on or off state or a level of light required to raise ambient light levels above a predetermined level; and
  a second lighting circuit configured to provide lighting at at least a second predetermined level of lighting intensity, said second lighting circuit configured to receive power from a mains electricity supply and being connected to at least one second light source, said second lighting circuit having at least one sensor input such that actuation of said sensor causes said second light source to provide said second predetermined level of lighting intensity: for a predetermined period of time, in response to ambient illumination meeting or exceeding a predetermined intensity, when said sensor has no input or has had no input for a predetermined period of time, or until re-set;
  wherein said second predetermined level of lighting intensity is greater than said first predetermined level of lighting.

It can therefore be seen there is advantageously provided a lighting system that has two separate control circuits, one for emergency and background lighting and the other for providing full lighting levels. The system also allows a minimum level of light to be constantly maintained when the lit area is not occupied and fully lit, for example, when users are present in a fire escape or car park, or when a vehicle or person is present in or approaching a tunnel. Advantageously, the system allows for the compensation of external or natural lighting that may also be intermittent.

BRIEF DESCRIPTION OF THE DRAWINGS

Preferred embodiments of the invention will now be described, by way of example only, with reference to the accompanying drawings in which.

DETAILED DESCRIPTION

Figure 1:
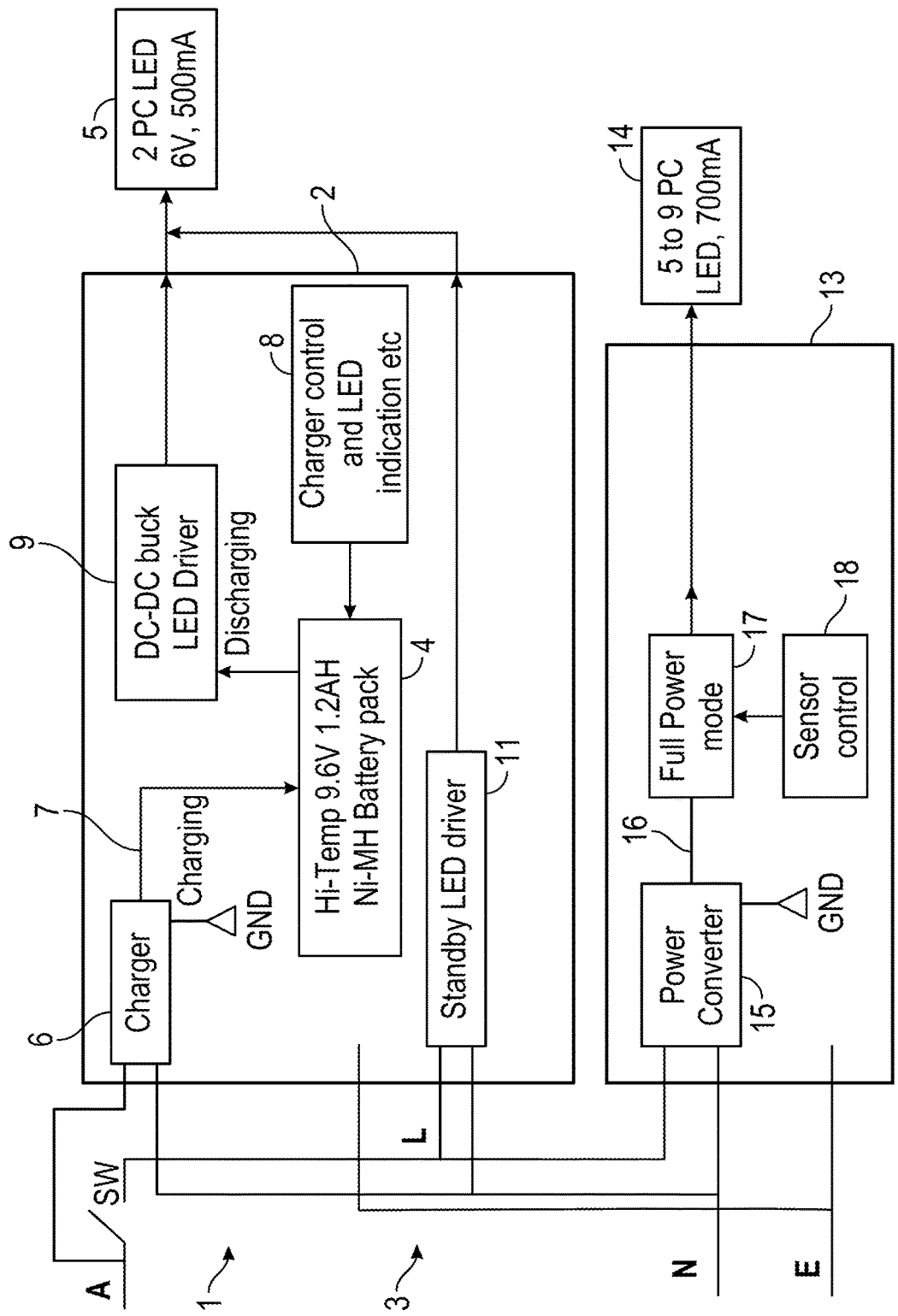
FIG. 1 is a schematic block diagram of a lighting system according to a first preferred embodiment.
Figure 2:
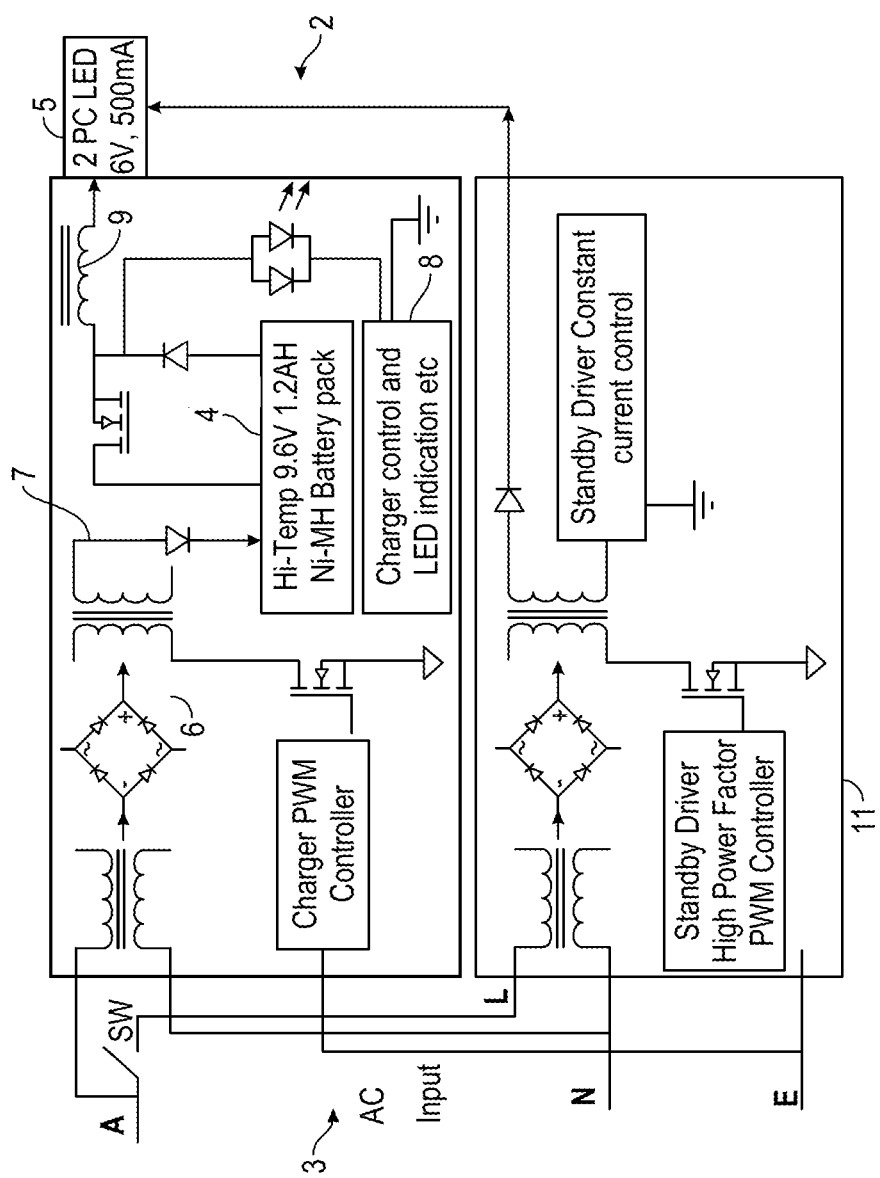
FIG. 2 is a schematic diagram of the circuit components of a first lighting circuit of the system of FIG. 1.
Figure 3:
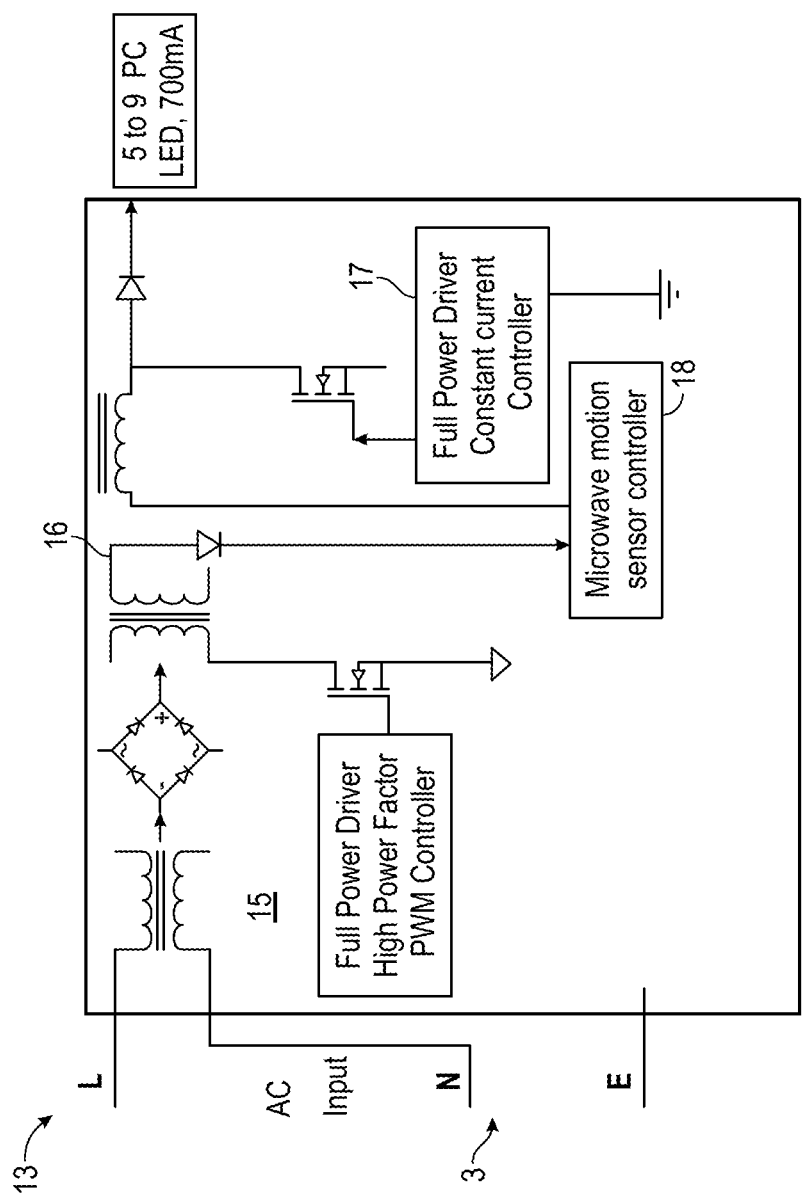
FIG. 3 a schematic diagram of the circuit components of a second lighting circuit of the system of FIG. 1.

Referring to FIGS. 1 to 3, there are shown schematic diagrams of a lighting system 1 according to a first preferred embodiment. The lighting system 1 includes a first lighting circuit 2 that is configured to provide a first predetermined level of lighting intensity.

The first lighting circuit 2 configured to receive power from either a mains electricity supply 3 or from a battery source 4 in the event the mains supply 3 is unavailable. The first lighting circuit 2 is connected to a first light source 5. The first light source 5 is composed of a plurality of LED lighting elements (not illustrated).

The first lighting circuit 2 further includes a charger 6 connected to the mains electricity supply 3. An output 7 of the charger 6 is connected to the battery source 4 as is a charge controller 8. The battery source 4 is connected to a first first-circuit LED driver circuit 9 configured to control power to the first LED light source 5 when under battery power and for when operating under mains electrical power the first lighting circuit 2 further includes a second first-circuit LED light driver 11 connected to the mains electricity supply 3 with an output connected to the first LED light source 5. The second first-circuit LED driver circuit 11 is configured to drive the first LED light source 5 when the mains electricity is available.

The first lighting circuit 2 is configured, when actuated, to provide lighting by the first light source 5 at the first predetermined level of lighting intensity. The level of intensity of light provided by the first light source 5 is in either an off state or on state in the preferred embodiment of FIG. 1.

The lighting system 1 further includes a second lighting circuit 13 configured to provide lighting at at least a second predetermined level of lighting intensity. The second lighting circuit 13 is connected to a second light source 14 which is composed of a plurality of LED lighting elements (not illustrated).

The second lighting circuit 13 further includes a power converter 15 connected to the mains electricity supply 3 and having an output 16 connected to an input of a first second-circuit LED driver circuit 17. The driver circuit 17 has an output connected to the second LED light source 14.

The lighting system 1 further includes a sensor 18 providing an input to the second lighting circuit 13. Actuation of the sensor 18 causes the second light source 14 to provide the second predetermined level of lighting intensity. The second light source 14 is actuated until the sensor 18 no longer has any input. In the first preferred embodiment, the sensor 18 is a motion sensor so that the second light source 14 is illuminated to provide the second predetermined level of lighting intensity whilst the sensor 18 detects motion, or for a period of time after motion is no longer sensed. However, it will be appreciated that in other embodiments (not illustrated) that the second light source 18 can, if desired, be configured so that it will not respond to the activation of the motion sensor and therefore will not activate the second predetermined level of lighting intensity, if ambient illumination meets or exceeds a predetermined intensity.

It will be appreciated that in the alternative, the second light source 14 can remain actuated providing the second predetermined level of lighting intensity for a predetermined period of time, in response to sensed ambient illumination meeting or exceeding a predetermined intensity obviating the need for the first predetermined level of lighting intensity, or until the second lighting circuit is otherwise manually or electronically re-set.

The second predetermined level of lighting intensity provided by the second LED light source 14 is greater than the first predetermined level of lighting intensity provided by the first light source 5. In the first preferred embodiment, the first level of lighting intensity provides a minimal emergency level of lighting and the second level of lighting intensity provides a brighter operational level of light. The second light source 14 when actuated provides a constant predetermined intensity corresponding to the second predetermined level of lighting intensity.

In other preferred embodiments (not illustrated), the intensity of light provided by the second light source 14 can vary to compensate for ambient light conditions so as to provide an adjacent area with a predetermined level of lighting intensity when the ambient lighting is inadequate in that adjacent area. In other words, the second lighting circuit 13 can include a photovoltaic or photosensitive sensor which causes the second lighting circuit 13 to reduce the lighting intensity provided by the second light source 14 to provide the second predetermined level of lighting intensity and compensate for ambient lighting conditions.

In the first preferred embodiment of FIGS. 1 to 3, when the second light source 14 is actuated to provide the second predetermined level of lighting intensity, the first light source 5 continues to emit light at the first predetermined level of lighting intensity. However, it will be appreciated that in other preferred embodiments of the invention (not illustrated), the first light source 5 can be configured not to emit light when the second light source 14 is actuated and providing the second predetermined level of lighting intensity.

It can therefore be seen that there is advantageously provided a lighting system 1 that can provide a first level of lighting intensity until motion or the presence of a person or vehicle is sensed in which case a brighter second predetermined lighting intensity is provided. Once the motion stops or the object moves away so as to stop actuating sensor 18 the second light source 14 is switched off. In this way lighting power is advantageously significantly reduced while continuing to meet the Australian Standards and the operational needs of the lit space.

The lighting system 1 can also vary the intensity provided by the first and second light sources 5 and 14 in response to an increase or diminution in ambient lighting conditions to meet a predetermined minimum level of lighting intensity. In this way, lighting power can be reduced when sufficient ambient light is present. Further, the lighting system 1 can be configured so that when motion is sensed by the sensor 18 then the second predetermined level of light is provided otherwise the first predetermined level of lighting is maintained.

This has the potential to save significant power but also allows a train driver going into a tunnel, for example, to have the train be sensed on approach so that lighting is turned on in a manner that decreases the lighting intensity as the train enters the tunnel and the drivers eyes acclimatise to the darker conditions. It will also be appreciated that the sensor 18 for the second lighting circuit 13 can be photovoltaic sensor, an infra-red or motion detector, or a microwave sensor, or any other preferred sensor. Yet further, the first and second lighting levels can be any as desired and may be selectable by a user once installed.

Figure 4:
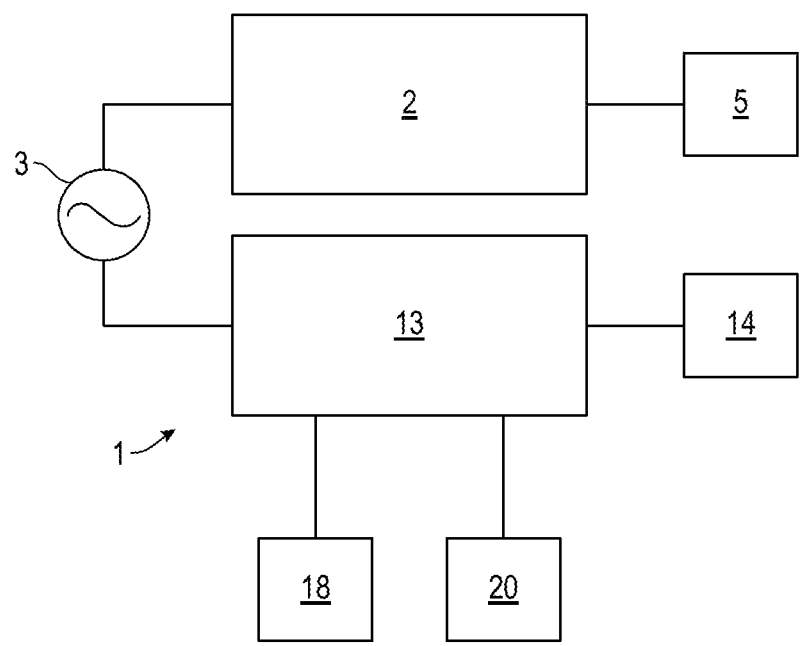
FIG. 4 is a schematic block diagram of a lighting system according to another preferred embodiment of the invention.

Referring now to FIG. 4, there is shown a second preferred embodiment of the lighting system 1. In this embodiment, like reference numerals have been used to denote like components and in addition to the features of the first preferred embodiment, the lighting system 1 includes a camera 20 that is configured to record images when the second light source 14 is actuated. The images are either stored locally and/or transmitted to a remote destination. It will also be appreciated that the lighting system 1 can also be include an alarm or the like that actuates in response to the actuation and operation of the second light source 14. This is particularly advantageous when the sensor 18 is a motion detector.

It will be understood that in preferred embodiments the lighting system 1 is contained within a housing. The housing contains the components of the system 1 and receives power therefor. The housing is able to be mounted to a support surface such as a ceiling or wall and includes a window adjacent the first and second light sources 5 and 14. Further, the battery source 4 within the housing is accessible via the window or via an access door or panel in the housing. This advantageously allows the battery source 4 or light sources 5 and 14 to be removed/replaced or inspected and allows the battery source 4 to be able to be removed or replaced without the light sources 5 and 14 being switched off if they are operating on mains electricity. This removes any down time of the lighting system 1 which can be particularly disputive in some environments. Of course, such components of the system 1 can be changed through the window or access door or panel.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A lighting system comprising:
   a first lighting circuit configured to provide a first predetermined level of lighting intensity and to receive power from a mains electricity supply or from a battery source if said mains supply is unavailable, said first lighting circuit connected to at least one first light source and configured, when actuated, to provide lighting at said first predetermined level of lighting intensity wherein said first light source is in either an on or off state or at a level of light required to raise ambient light levels above a predetermined level; and
   a second lighting circuit configured to provide lighting at least a second predetermined level of lighting intensity, said second lighting circuit configured to receive power from a mains electricity supply and being connected to at least one second light source, said second lighting circuit having a separate control circuit to the first lighting circuit, the second lighting circuit having at least one sensor input such that actuation of said sensor causes said second light source to provide said second predetermined level of lighting intensity: for a predetermined period of time; in response to ambient illumination meeting or exceeding a predetermined intensity; when said sensor has no input or has had no input for a predetermined period of time; or until re-set;
   wherein said second predetermined level of lighting intensity is greater than said first predetermined level of lighting.

2. A lighting system according to claim 1 wherein said first light source lighting intensity is sufficient in response to a background lighting intensity to maintain an energy or background lighting intensity at a predetermined intensity level.

3. A lighting system according to claim 1 wherein:
   said first and second light sources each include a plurality of LED light elements;
   said first lighting circuit includes a charger receiving mains electricity input and an output connected to said battery and includes a charge controller connected to said battery, said battery being connected to a first first-circuit LED driver circuit configured to control power to said first LED light source when under battery power and for when operating under mains electricity power said first lighting circuit further includes a second first-circuit LED light driver connected to said mains electricity supply and an output connected to said first LED light source such that said second first-circuit LED driver circuit is configured to drive said first LED light source when mains electricity is available; and
   said second lighting circuit including a power converter having mains electricity input and an output connected to an input of a first second-circuit LED driver circuit having an output connected to said second LED light source;
   wherein said second predetermined level of lighting intensity is provided at some constant predetermined intensity, or it is variable to compensate for a non-fixed ambient lighting intensity to provide an area with a predetermined level of lighting intensity when ambient lighting is inadequate.

4. A lighting system according to claim 1 wherein said first light source is configured to either emit light or to not emit light when said second light source is actuated to provide said second predetermined level of lighting intensity; and/or wherein said lighting system only provides said second level of predetermined lighting intensity when said sensor is a motion sensor or a sensor detecting the presence of an object receiving input that an adjacent area is being occupied.

5. A lighting system according to claim 1 wherein said first lighting circuit includes a photovoltaic sensor input to allow actuation of said first light source only if an ambient light level is below a predetermined level.

6. A lighting system according to claim 1 wherein said second lighting circuit includes a photovoltaic sensor input to allow actuation of said second light source only if an ambient light level is below a predetermined level.

7. A lighting system according to claim 1 wherein said sensor of said second lighting circuit is a photovoltaic sensor, an infra-red or motion detector or a microwave sensor.

8. A lighting system according to claim 1 wherein said first and/or second light sources each include two or more groups of LED light elements.

9. A lighting system according to claim 1 wherein said system includes a camera configured to record images in response to operation of said second light source, or includes an alarm configured to actuate in response to operation of said second light source.

10. A lighting system according to claim 1 wherein said first and second lighting circuits are configured to provide no lighting if ambient light levels exceed first and second predetermined lighting intensity levels respectively.

11. A lighting system according to claim 1 wherein said first lighting circuit including a sensor input such that actuation thereof actuates said first light source.

12. A lighting system according to claim 1 wherein said first light source is configured to provide said first predetermined level of lighting intensity corresponding to an emergency lighting intensity level.

13. A lighting system according to claim 1 wherein said first and second lighting circuits provide, when actuated, sufficient level of lighting intensity to increase ambient lighting to some predetermined level.

14. An emergency lighting system comprising:
a first lighting circuit connected to at least one LED lighting element, a mains electricity supply, and a battery source, said first lighting circuit being configured to actuate said at least one LED lighting element of said first lighting circuit if said mains supply is unavailable and provide light at a first predetermined emergency intensity;
a second lighting circuit connected to at least one LED lighting element, said second lighting circuit including a separate control circuit to the first lighting circuit, the second light circuit being configured to actuate said at least one LED lighting element of said second lighting circuit to provide light at a second predetermined intensity when said mains electricity supply is available, said second lighting circuit having a sensor input adapted to detect availability of the mains electricity supply; and
wherein said second predetermined intensity is greater than said emergency intensity.

15. A system according to claim 14 wherein:
said first lighting circuit including a charger receiving mains electricity input and an output connected to said battery source, a charge controller, said battery connected to a first circuit LED driver configured to control battery power provided to said at least one LED lighting element of said first lighting circuit; and
a power converter associated with said second lighting circuit, said power converter having mains supply input and an output connected to said input of a second circuit LED driver having an output connected to said at least one LED lighting element of said second lighting circuit.

* * * * *